US012722266B2

(12) United States Patent
Wilson

(10) Patent No.: US 12,722,266 B2
(45) Date of Patent: Sep. 1, 2026

(54) MAGNETICALLY DETACHABLE STAPLER DEVICE

(71) Applicant: Catherine Wilson, St. Thomas, VI (US)

(72) Inventor: Catherine Wilson, St. Thomas, VI (US)

( * ) Notice: Subject to any disclaimer, the term of this patent is extended or adjusted under 35 U.S.C. 154(b) by 0 days.

(21) Appl. No.: 18/196,365

(22) Filed: May 11, 2023

(65) Prior Publication Data

US 2023/0364765 A1 Nov. 16, 2023

Related U.S. Application Data

(60) Provisional application No. 63/340,481, filed on May 11, 2022.

(51) Int. Cl.
*B25C 5/02* (2006.01)
*B25C 5/11* (2006.01)

(52) U.S. Cl.
CPC .............. *B25C 5/0292* (2013.01); *B25C 5/11* (2013.01)

(58) Field of Classification Search
CPC ................................ B25C 5/0292; B25C 5/11
See application file for complete search history.

(56) References Cited

U.S. PATENT DOCUMENTS 6,991,146 B2 * 1/2006 Sinisi ........................ B25C 5/02 227/119
10,821,588 B2 * 11/2020 Li ......................... B25C 5/0221

OTHER PUBLICATIONS

Youtube video, title: How to Make a Two Part Magnetic Stapler, channel: DIY Hacks and How Tos, url: https://www.youtube.com/watch?v=js-IbtoBAME (Year: 2013).*

* cited by examiner

*Primary Examiner* — Thomas M Wittenschlaeger

(57) ABSTRACT

A magnetically detachable stapler device is provided that utilizes a bottom housing having a first magnetic coupling element. The first magnetic coupling element utilizes a first low friction material layer disposed thereupon. The stapler device utilizes a top housing having a coupling base structure, a magazine and a hammer. At least one of the top housing, the magazine and the hammer moves relative the coupling base structure. The coupling base structure utilizes a second magnetic coupling element which itself has a second low friction material layer disposed thereupon.

17 Claims, 12 Drawing Sheets

MAGNETICALLY DETACHABLE STAPLER DEVICE

CROSS-REFERENCE TO RELATED APPLICATIONS

This application claims priority to U.S. Provisional Patent Application Ser. No. 63/340,481, entitled "Magnetically Detachable Stapler Device," filed May 11, 2022. The contents of this application are hereby incorporated by reference in their entirety.

BACKGROUND OF THE INVENTION

General use staplers have been on the market for over a century and have undergone significant improvements over time. The earliest commercially successful stapler was developed in 1899, and since then, various designs have been developed for manual and electric staplers with different loading mechanisms, capacities, and stapling methods. There have also been specialized staplers for specific applications, such as saddle staplers for bookbinding or long-reach staplers for stapling large sheets of paper. Additionally, ergonomic designs for staplers that are more comfortable to use, such as those with padded handles or alternative grip configurations, have been developed and innovation continues in the industry.

The office stapler industry had a global value estimated around $1.1 billion in 2020, and was expected to grow at a CAGR of 3.9% from 2021 to 2028. The demand for office staplers is driven by the need for binding and organizing paper documents in offices, schools, and other professional settings. The market for office staplers has seen steady growth in demand, with increased adoption of staplers in emerging markets. Additionally, there is a growing trend towards sustainable staplers that use recycled materials or are refillable to reduce waste, which is likely to drive innovation and investment in the industry. Overall, the office stapler industry is a large and growing market with many opportunities for new products and technologies.

Traditional office staplers are designed to be used with standard-sized sheets of paper and may not be effective for larger or irregularly shaped documents. While long-reach staplers are available to address this problem, they can be bulky, expensive, and difficult to use. In addition, long-reach staplers may not be able to reach certain staple points or may cause uneven stapling. As a result, there is a need for a stapler design that combines the ease of use and affordability of traditional staplers with the extended reach and versatility of long-reach staplers. Such a design would enable users to easily staple larger or irregularly shaped documents without the need for a specialized long-reach stapler. This would save time and reduce frustration for users, while also providing a cost-effective solution for organizations that require a stapler that can accommodate a wide range of document sizes and shapes.

Long-reach staplers are designed to reach further than traditional office staplers, making them a useful tool for stapling larger or irregularly shaped documents. However, users of long-reach staplers may encounter several problems when using these devices. For example, uneven stapling can occur when the stapler is not aligned properly with the document being stapled, leading to a messy appearance. Jamming can also be an issue with long-reach staplers, given the extended length of the stapler rack. In addition, long-reach staplers can be tiring to use, particularly if the user is stapling a large number of sheets of paper, which can lead to hand strain and fatigue. Stability can also be a problem with long-reach staplers, as they can be awkward to use and may require additional support to ensure proper alignment with the document being stapled. Addressing these issues through improved stapler design could help to improve the effectiveness and ease of use of long-reach staplers and provide a better stapling experience for users.

Given the preceding needs highlighted in the market of general-use staplers, it would be advantageous to provide a stapler device that gives the user the functionality of a long-reach stapler but without the drawbacks. Specifically, it would be advantageous to provide a stapler device that is able to separate the top and bottom halves of the stapler from one another and recouple them iteratively as desired by the user. This functionality would allow the user the ability to staple workpieces at staple positions that would otherwise be impossible to execute even with a long-reach stapler. Further, this functionality would also allow the user to execute at staple positions which a long-reach stapler would be able to reach.

Therefore, the present invention relates to a magnetically detachable stapler device, which provides several advantages over traditional staplers. The conventional staplers have limitations in terms of reach and binding capacity, which often require a long-reach stapler for specific applications. However, the proposed stapler solves the problem by providing a simple yet effective way to increase the reach and binding capacity of the stapler. One of the primary advantages of utilizing such a magnetically coupled separable stapler is its flexibility. With the magnetic element, the stapler can be easily and quickly split into two separate halves, allowing it to be used for stapling documents of various sizes and shapes. This feature makes the stapler more versatile and useful for a wider range of applications.

Moreover, the stapler's magnetic coupling mechanism eliminates the need for mechanical fasteners, which simplifies its design and reduces its production costs. Additionally, this design reduces the chances of jams or misalignments, which can be frustrating and time-consuming to correct. Another advantage of the magnetically coupled separable stapler is its portability. As the stapler can be easily disassembled into two halves, it is smaller and more compact, making it easier to carry in a briefcase or backpack. This feature is particularly useful for people who frequently travel for work and need to carry their staplers with them.

Further, it would be advantageous to provide a magnetically detachable stapler device that may function as a conventional office stapler in a mechanically coupled configuration and as a magnetically coupled separable stapler in a magnetically coupled configuration. Thereby, the user may transition the stapler between a mechanically coupled configuration, a magnetically coupled configuration and a separated configuration where the top and bottom halves of the stapler are not coupled to one another at all. This provides the stapler with increased functionality within a greater number of potential use cases relative traditional office staplers.

DETAILED DESCRIPTION OF THE INVENTION

Figure 1:
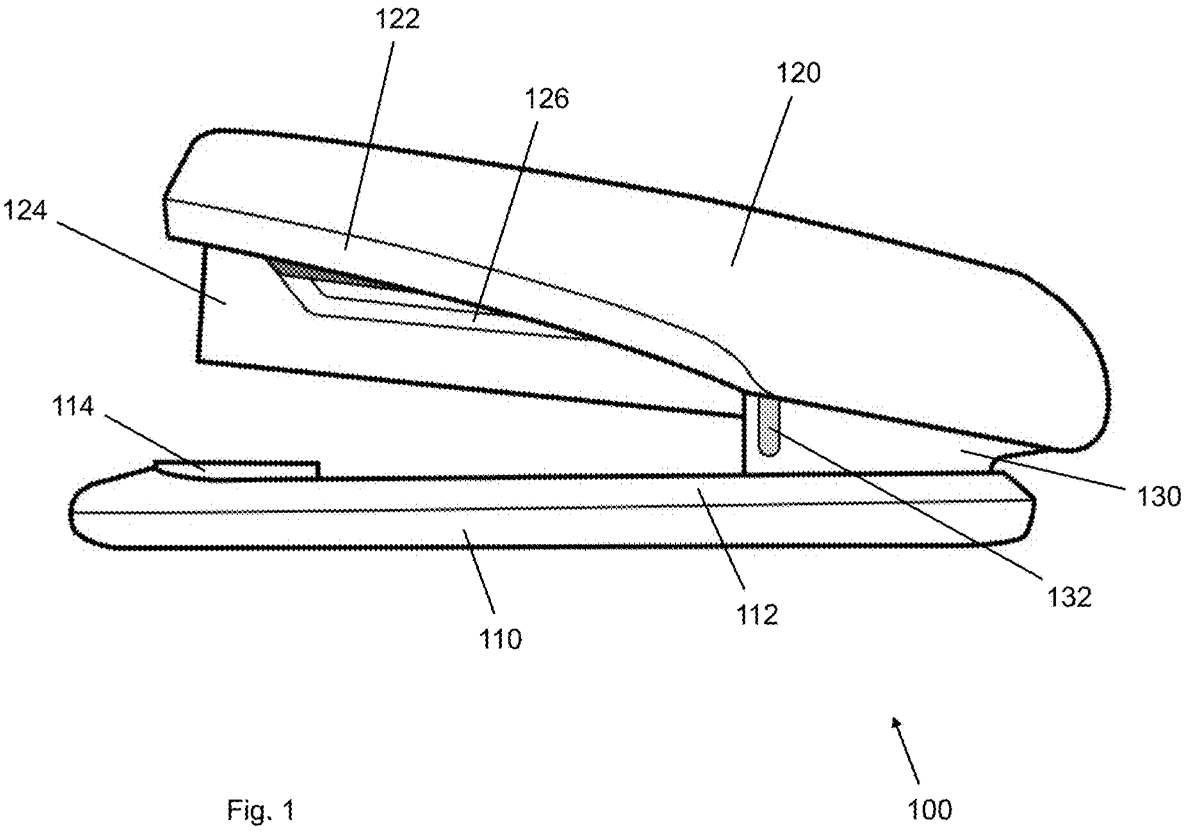
FIG. 1 illustrates a side elevational view of a magnetically detachable stapler device in an operational configuration in accordance with some embodiments of the present invention.

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "a magnetically attachable stapler device" also includes a plurality of magnetically attachable stapler devices and the like.

In some embodiments, a magnetically detachable stapler device is provided comprising a bottom housing having a first magnetic coupling element, wherein: the first magnetic coupling element comprises a first low friction material layer disposed thereupon; and a top housing having a coupling base structure, a magazine and a hammer, wherein: at least one of the top housing, the magazine and the hammer moves relative the coupling base structure, the coupling base structure comprises a second magnetic coupling element, and the second magnetic coupling element comprise a second low friction material layer disposed thereupon.

In some embodiments, the bottom housing comprises a first contoured bevel.

In some embodiments, the bottom housing comprises an anvil crimp area.

In some embodiments, the bottom housing comprises a cavity disposed therein.

In some embodiments, the bottom housing comprises one or more restorative force elements within the cavity.

In some embodiments, a support plate is supported by the one or more restorative force elements within the cavity.

In some embodiments, the cavity comprises first retention channels.

In some embodiments, the cavity comprises a partial opening shaped to accommodate insertion of the coupling base structure therein.

In some embodiments, the coupling base structure comprises one or more frictional retaining guides.

In some embodiments, the coupling base structure comprises second retention channels.

In some embodiments, first retention channels of the bottom housing are shaped to interlock with the second retention channels.

In some embodiments, the top housing, the magazine and the hammer all rotate relative the coupling base structure; and the coupling base structure comprises a hinge inserted therethrough about which the top housing, the magazine and the hammer all rotate.

In some embodiments, the coupling base structure comprises a spring disposed between the magazine and the second magnetic coupling element.

In some embodiments, one or more frictional retaining guides of the coupling base structure frictionally retain the magazine.

In some embodiments, the top housing comprises a second contoured bevel.

In some embodiments, the coupling base structure is disposed in a magnetically coupled configuration when the first magnetic coupling element is disposed adjacent to the second magnetic coupling element.

In some embodiments, in the magnetically coupled configuration, the first and second low friction material layers are disposed between the first and second magnetic coupling elements.

In some embodiments, in the magnetically coupled configuration, the first and second low friction material layers are not in direct contact when in a workpiece configuration and are in direct contact when in a non-workpiece configuration.

In some embodiments, a magnetically detachable stapler device is provided, comprising a bottom housing having a first magnetic coupling element, wherein: the first magnetic coupling element comprises a first low friction material layer disposed thereupon; and a top housing having a coupling base structure, a magazine and a hammer, wherein: at least one of the top housing, the magazine and the hammer moves relative the coupling base structure, the coupling base structure comprises a second magnetic coupling element, the second magnetic coupling element comprise a second low friction material layer disposed thereupon, the coupling base structure is disposed in a magnetically coupled configuration when the first magnetic coupling element is disposed adjacent to the second magnetic coupling element, and in the magnetically coupled configuration, the first and second low friction material layers are disposed between the first and second magnetic coupling elements.

In some embodiments, a magnetically detachable stapler device is provided comprising a bottom housing having a first magnetic coupling element, wherein: the first magnetic coupling element comprises a first low friction material layer disposed thereupon; and a top housing having a coupling base structure, a magazine and a hammer, wherein: at least one of the top housing, the magazine and the hammer moves relative the coupling base structure, the coupling base structure comprises a second magnetic coupling element, the second magnetic coupling element comprise a second low friction material layer disposed thereupon, the coupling base structure is disposed in a magnetically coupled configuration when the first magnetic coupling element is disposed adjacent to the second magnetic coupling element, and in the magnetically coupled configuration, the first and second low friction material layers are not in direct contact when in a workpiece configuration and are in direct contact when in a non-workpiece configuration.

Exemplary embodiments of the present invention are illustrated in the accompanying figures. As shown in FIG. 1, a side elevational view of a magnetically detachable stapler device 100 in an operational configuration is provided. The magnetically detachable stapler device 100 may comprise a bottom housing 110 and a top housing 120 connected via a coupling base structure 130. The bottom housing 110 may comprise a first contoured bevel 112 formed into the shape thereof and an anvil crimp area 114 disposed over the first contoured bevel 112 as shown in FIG. 1. In use, the anvil crimp area 114 may provide a rigid structure upon which an ejected staple may be crimped to be secured around a workpiece in a known manner common to staples.

The top housing 120 may comprise a second contoured bevel 122 formed into the shape thereof that terminates into a cavity disposed within the hollow body of the top housing 120. Partially disposed within this cavity may be a magazine 124 having a groove 126 formed therein as shown in FIG. 1. The magazine 124 may be designed to retain a row of staples therein while the groove 126 is structured to allow a stabilizing structure to pass therethrough which stabilizes the coupling of the top housing 120 and magazine 124 when in various configurations. This stabilizing structure and groove 126 also provides the user a robust means of separating the top housing 120 from the magazine 124 in order to perform routine maintenance on the stapler device 100 such as reloading the magazine 124 with more staples or clearing a jammed staple therefrom.

The coupling base structure 130 may be permanently coupled to the top housing 120 and the magazine 124 via a hinge passing through each. Thereby, the top housing 120 and the magazine 124 may rotate relative the coupling base structure 130 which allows the stapler device 100 the basic functionality of hammering staples into workpieces as well as the secondary functionality of rotating the top housing 120 and the magazine 124 so that the stapler device 100 may be manipulated by the user between the operational configuration, the reloading configuration and the non-operational open configuration. FIG. 1 illustrates the stapler device 100 in the operational configuration in which it may perform the functionality of hammering staples into workpieces. In this configuration, a frictional retaining guide 132 (that is debossed into an outer surface of the coupling base structure 130) may serve as one part of the mechanism to maintain the stapler device 100 in the operational configuration.

Figure 2:
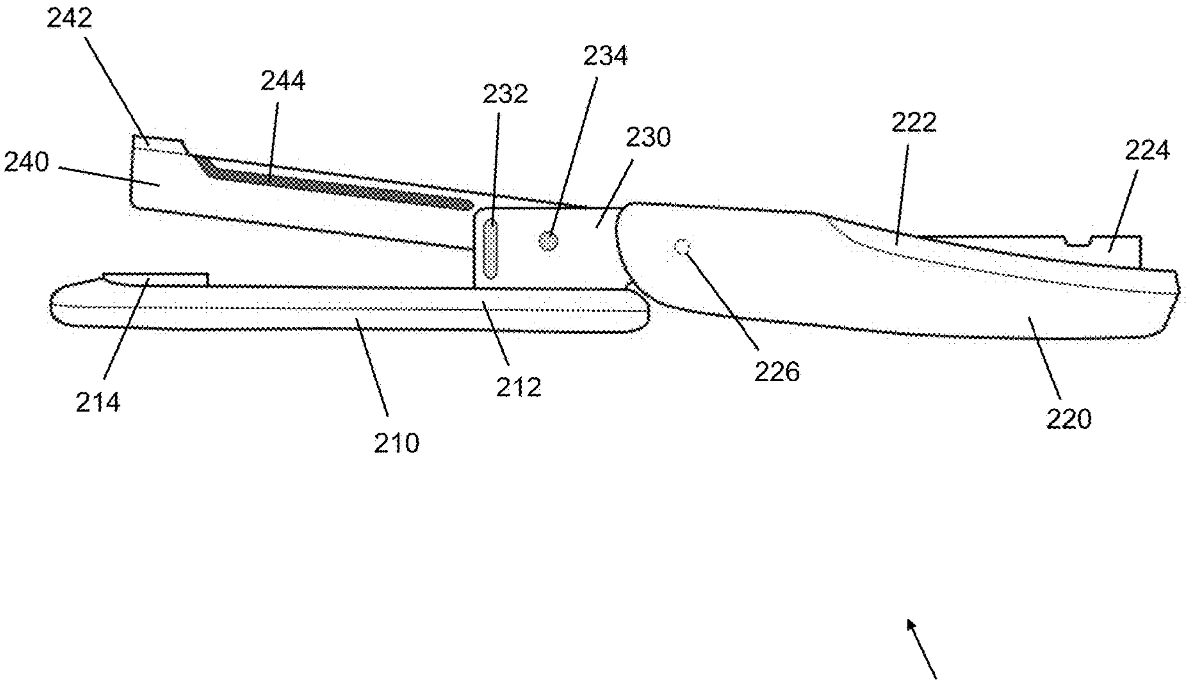
FIG. 2 illustrates a side elevational view of a magnetically detachable stapler device in a reloading configuration in accordance with some embodiments of the present invention.

As shown in FIG. 2, a side elevational view of a magnetically detachable stapler device 200 in a reloading configuration is provided. The stapler device 200 and its structural components may be at least similar to the structure of the device 100 of FIG. 1. Specifically, the stapler device 200 may comprise a bottom housing 210, a top housing 220, a coupling base structure 230 and a magazine 240. The top housing 220, the coupling base structure 230 and the magazine 240 may be coupled together via a hinge 226 that allows each to rotate relative one another. The bottom housing 210 may be coupled directly to the coupling base structure 230 and so by extension to the top housing 220 and the magazine 240 and so on.

Further, FIG. 2 additionally highlights a flange 242 extending at an angle away from the body of the magazine 240. One or more flanges 242 may be utilized along a top surface of the magazine 240 in order to stabilize rotation of the magazine 240 relative a hammer 224 of the top housing 220. Adjacent the flange 242, an embossed groove 244 may be disposed along the length of the magazine 240 that acts as a guiding mechanism for a pusher known in the art to drive staples forward to be impacted by the hammer 224. The magazine 240 may be removably coupled to the coupling base structure 230 via first and second frictional retaining guides 232, 234 that may be debossed into the outer surface of the coupling base structure 230 so that the inner surface contacts and frictionally engages with the outer surface of the magazine 240 body. Such frictional engagement maintains the magazine 240 in the operational configuration and so the shapes of the guides 232, 234 may be selected to engage the magazine 240 for a first predetermined range of angular rotation therebetween. The first predetermined range of angular rotation may advantageously be between 15 degrees and 25 degrees of total relative rotation.

When the frictional engagement ceases the magazine 240 may rotate freely without friction for a second predetermined range of angular rotation therebetween. The first predetermined range of angular rotation may advantageously be between 145 degrees and 175 degrees of total relative rotation. The magazine 240 may freely rotate until it reaches the hammer 224 as shown in FIG. 2. At that point, the magazine 240 may frictionally engage with the hammer 224 and become removably coupled thereto. All relative rotation between these structural parts is determined relative an axis running axially through the hinge 226.

Figure 3:
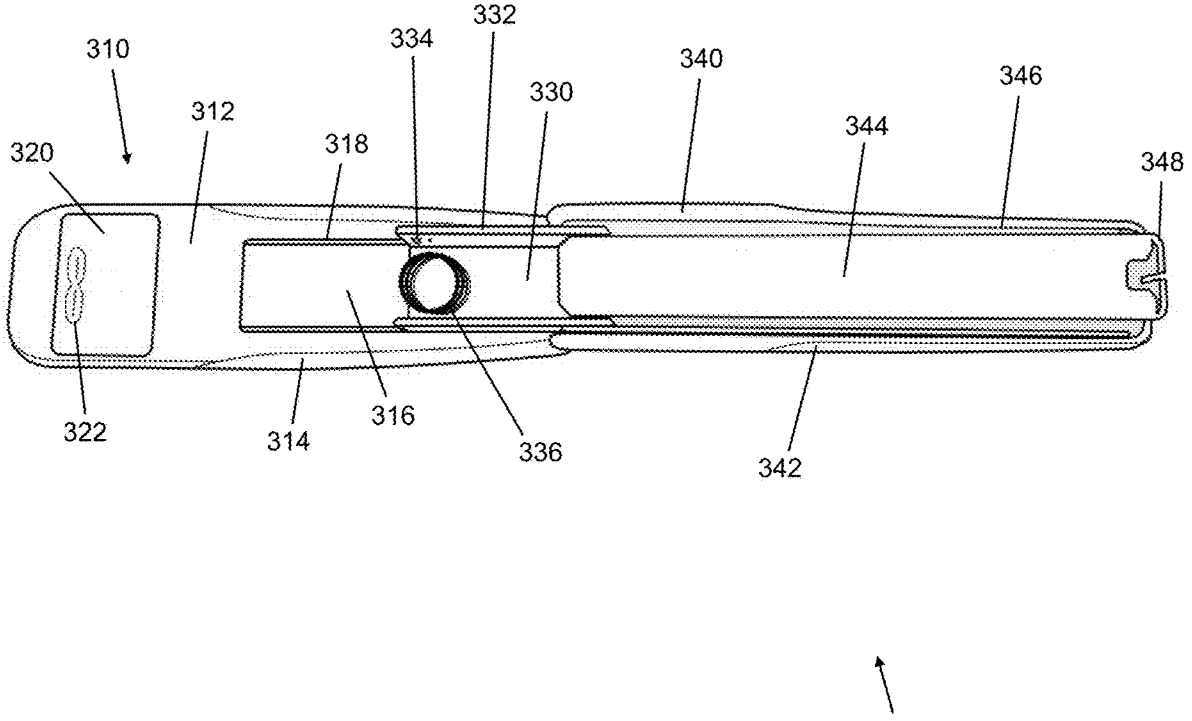
FIG. 3 illustrates a perspective overhead view of a magnetically detachable stapler device in a non-operational open configuration in accordance with some embodiments of the present invention.

As shown in FIG. 3, a perspective overhead view of a magnetically detachable stapler device 300 in a non-operational open configuration is provided. The magnetically detachable stapler device 300 and its structural components may be at least similar to the structure of the device 100 of FIGS. 1-2. Specifically, the stapler device 300 may comprise a bottom housing 310, a top housing 340, a coupling base structure 330 and a magazine 344. The top housing 340, the coupling base structure 330 and the magazine 344 may be coupled together via a hinge that allows each to rotate relative one another. The bottom housing 310 may be coupled directly to the coupling base structure 330 and so by extension to the top housing 340 and the magazine 344.

From the perspective of FIG. 3, the anvil 320 and crimp area 322 are shown as the striking surface collectively for the magazine 344, a hammer 346 and a staple ejection port 348. The top housing spring 336 is shown between a pair of parallel walls 332 of the coupling base structure 330. A plurality of frictional retaining guides 334 are shown in FIG. 3 embossed from the inner surface of at least one of the parallel walls 332. The bottom housing 310 comprises a top planar surface 312 and an ergonomically-shaped contoured surface 314 that define a partial cavity 318 therein. The cavity 318 may be shaped at least large enough to accept a bottom portion of the parallel walls 332 of the coupling base structure 330.

Upon insertion within the cavity 318, the bottom portion of the walls 332 will be incident upon a support plate 316 which supports the load applied by the user inserting the bottom portion thereupon. The support plate 316 acts a structural intermediary between the bottom portion and a restorative force element. The restorative force element may be any object or structure that provides a restorative force when the support plate 316 is bearing the load of the user's applied force. Once inserted within the cavity 318, the bottom portion of the walls 322 may couple to an interior portion of the top planar surface 312 that defines the cavity 318.

This coupling may be achieved via interlocking an elongate ridge within a structurally-correspondent guide groove which frictionally engage with one another via the restorative force being applied at least close to orthogonal to the orientation of the elongate ridge and guide groove. The elongate ridge and guide groove may be located anywhere on the bottom portion of the walls 322 and the interior portion of the top planar surface 312. Alternatively, the coupling may be achieved via two flat engagement lips disposed on each of the bottom portion of the walls 322 and the interior portion of the top planar surface 312, where the bottom portion lip is disposed underneath the interior portion lip and friction is created therebetween upon application of the restorative force.

Further, a magnetic coupling force between a first magnetic coupling element disposed at the bottom portion of the walls 322 and a second magnetic coupling element disposed within the support plate 316 may further aid in retaining the coupling base structure 330 within the cavity 318 after the user ceases applying the insertion force. The object of retaining the coupling base structure 330 within the cavity 318 is to keep the stapler device 300 structurally stable while the user applies forces to it during normal use as a stapler. However, when the stapler device 300 is not long enough in dimension to reach a desired staple position, the coupling base structure 330 may be removed from the cavity 318 and the first and second magnetic coupling elements decoupled from one so that the top housing 340 and the bottom housing 310 may selectively be magnetically coupled together around a workpiece to reach the desired staple position thereupon.

The support plate 316 may emerge within an opening defined by the cavity 318 that spans a portion of the length of the bottom housing 310. Advantageously, the length dimension of the cavity 318 and opening may be at least twice the length dimension of the coupling base structure 330 in order to allow it to enter the cavity 318 so it can be slid into frictional engagement with the grooves, ridges and/or lips of the bottom housing 310 and magnetic engagement with the magnetic coupling element of the support plate 316.

Figure 4:
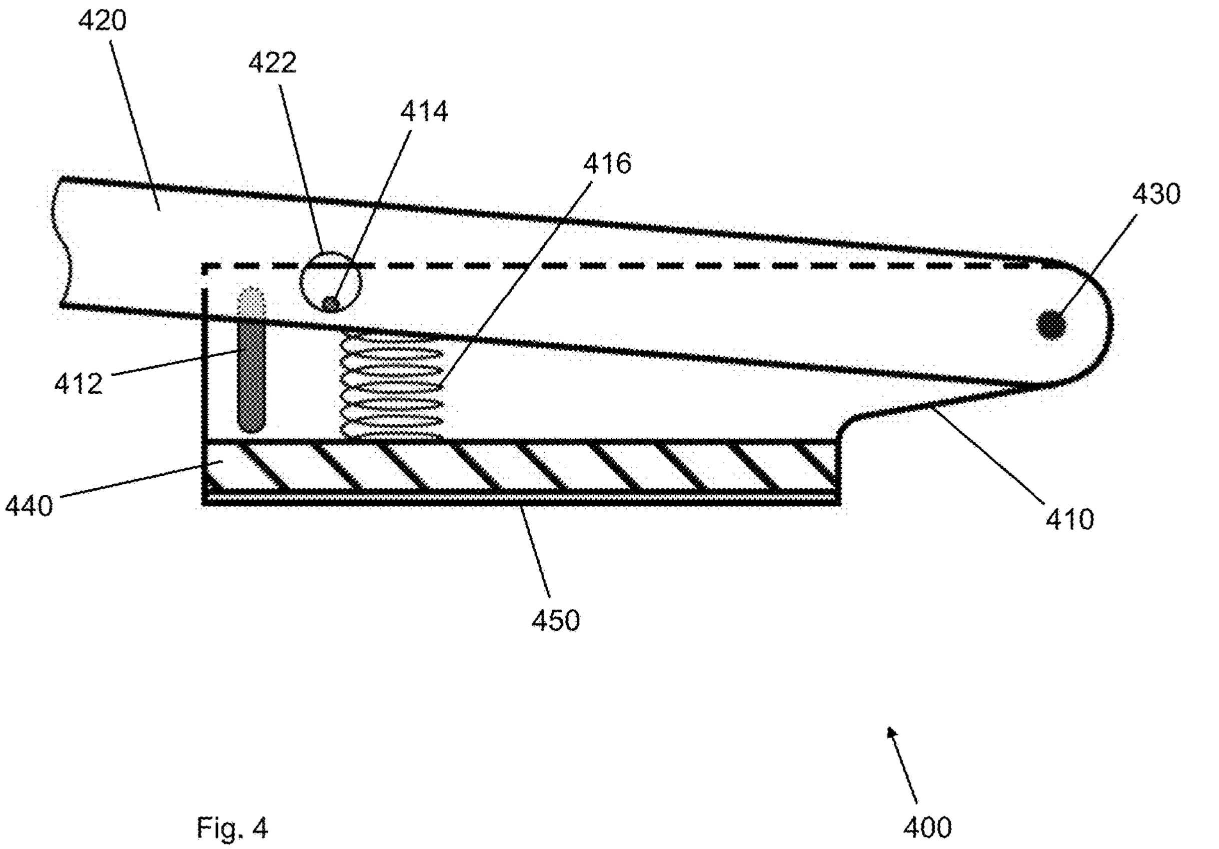
FIG. 4 illustrates a partial cross-sectional view of structural components of a top housing of a magnetically detachable stapler device in accordance with some embodiments of the present invention.

As shown in FIG. 4, a partial cross-sectional view of structural components comprising a coupling base structure 410 and a magazine 420 within a top housing of a magnetically detachable stapler device 400 is provided. The structural components may be associated with a magnetically detachable stapler device 400 such as those described with reference to FIGS. 1-3. The structural components may comprise the coupling base structure 410 having first and second frictional retaining guides 412, 414 shown embossed out of an inner surface of one of the parallel walls of the base structure 410.

Upon compression of a top housing spring 416 between the magazine 420 and a first magnetic coupling element 440, the guides 412, 414 may frictionally engage a surface of the magazine 420 which thereby prevents the free unrestrained rotation of the magazine 420 about a hinge 430. Specifically, the guide 412 may frictionally engage with the surface of the magazine 420 along its entire length while guide 414 may be shaped to frictionally engage only with a portion of the surface of the magazine 420. This may be achieved by utilizing an aperture 422 cut out off the surface of the magazine 420 as shown in FIG. 4.

Advantageously, the dimension of the diameter of the aperture 422 may be at least as large as the arc length distance required for the stapler device 400 to hammer a staple into a workpiece. This allows the magazine 420 of stapler device 400 to more easily traverse (i.e. less frictional engagement) through the normal range of motion of stapling a workpiece, but still provides added frictional engagement outside of this normal range of motion which prevents the stapler device 400 from accidentally being taken out of the operational configuration and into the non-operational open configuration.

The first magnetic coupling element 440 may be disposed within a bottom portion of the parallel walls of the coupling base structure 410. A layer of low friction material 450 may be disposed over a bottom surface of the first magnetic coupling element 440. The low friction material may be selected so as to have a low coefficient of friction with common workpiece materials such as paper, cardboard, posterboard and like materials. Such materials may include, but are not limited to, Teflon, silicone, graphene, molybdenum disulfide, polytetrafluoroethylene, hydrophilic coatings such as polyvinylpyrrolidone or polyethylene glycol and the like or any combination thereof.

Figure 5:
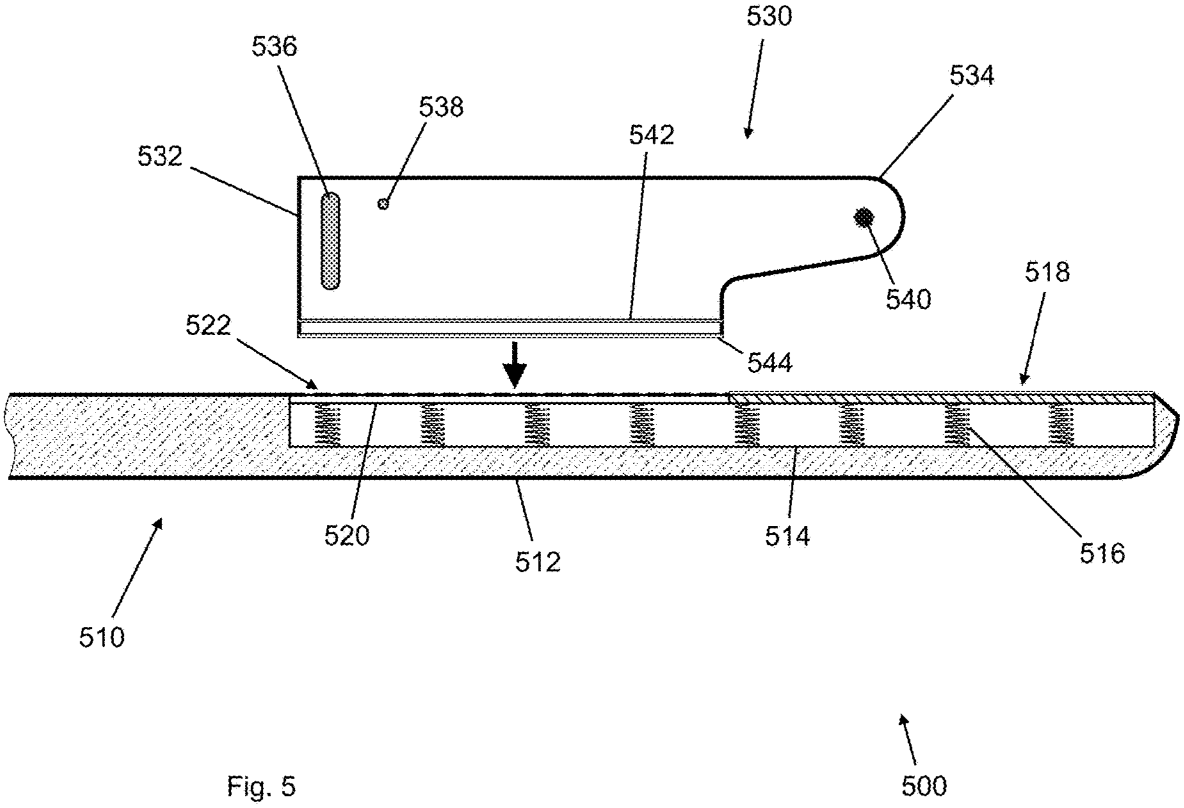
FIG. 5 illustrates a side elevational view of a coupling base structure of a top housing of a magnetically detachable stapler device in an unsecured position about to be inserted within a bottom housing of the magnetically detachable stapler device in accordance with some embodiments of the present invention.

As shown in FIG. 5, a side elevational view of a coupling base structure 530 of a top housing of a magnetically detachable stapler device 500 in an unsecured position about to be inserted within a bottom housing 510 of the stapler device 500 is provided. The magnetically detachable stapler device 500 may comprise the bottom housing 510 having an outer surface 512 that comprises an opening 522 therein which allows access to a cavity 514 disposed within the body of the bottom housing 510.

The cavity 514 may comprise one or more restorative force elements 516 disposed therein underneath a support plate 520. Each of the one or more restorative force elements 516 may apply an even distribution of force across the length of the support plate 520 such that the length of the plate 520 is manipulated against the opening 522 when the one or more restorative force elements 516 are in the default relaxed state. The support plate 520 may comprise a second magnetic coupling element 518 which is designed to engage with a first magnetic coupling element 544. Each of the first and second magnetic coupling elements 518, 544 may comprise a layer of low friction material disposed there-overover. The low friction material may be selected so as to have a low coefficient of friction with common workpiece materials such as paper, cardboard, posterboard and like materials. Such materials may include, but are not limited to, Teflon, silicone, graphene, molybdenum disulfide, polytetrafluoroethylene, hydrophilic coatings such as polyvinylpyrrolidone or polyethylene glycol, and like materials or any combination thereof.

The selection of material and type for the first and second magnetic coupling elements 518, 544 may be selected based upon the desired magnetic coupling strength between the two magnetic elements. The phrase "magnetic elements" and "magnetic coupling elements" may be broadly construed to encompass at least one object exhibiting a magnetic force via magnetic field lines. If only one object exhibiting a magnetic force is utilized, then an object susceptible to magnetic forces via magnetic field lines (e.g. iron, nickel, cobalt and the like or any alloys or compounds thereof which may include aluminum, copper, silver and the like or any combinations thereof) may be utilized in conjunction therewith in order to provide a complimentary object to which the magnetic force-exhibiting object may magnetically couple. In one example amongst many, a magnet may be utilized with a magnetically susceptible metallic structure. In another example amongst many, two magnets being at least partially magnetically attracted to one another may be utilized.

The selection of the type of magnet(s) to be utilized depends upon the desired magnetic coupling strength between the two magnetic elements. Some examples of types of magnets that can be utilized include, but are not limited to, neodymium magnets, alnico magnets, ceramic magnets, samarium cobalt magnets, ferrite magnets, flexible rubber magnets, bar magnets, cylindrical magnets, horseshoe magnets, ring magnets, disc magnets and the like or any combination thereof. Further, the selection of the magnetic array to the utilized may comprise various arrays of magnets including, but not limited to, linear Halbach arrays, radial Halbach arrays, dipole arrays, quadrupole arrays and the like or any combination thereof.

Specifically, neodymium magnets are the strongest permanent magnets available, and they provide a high level of magnetic force attraction. However, they may be too strong for use in a magnetically coupled stapler, as they could make it difficult to separate the top and bottom halves of the stapler or cause excessive friction when sliding paper between them. Therefore, to achieve an ideal range of magnetic force attraction (i.e. strong enough to keep the top and bottom halves magnetically coupled, but not so strong as to create a threshold amount of friction that prevents paper from sliding therebetween), the neodymium magnets could be designed with a lower magnetic strength or combined with other magnets to achieve the desired level of attraction.

Further, bar magnets provide a relatively uniform magnetic field and can be arranged in a variety of configurations to achieve different levels of magnetic force attraction. For example, two bar magnets could be arranged in a repelling configuration to create a magnetic field that is strongest at the edges and weakest in the center, allowing for easy alignment of the top and bottom halves of the stapler. Alternatively, the bar magnets could be arranged in a Halbach array, which creates a strong magnetic field on one side and a weaker field on the other side, providing the ideal range of magnetic force attraction.

Additionally, cylindrical magnets can provide a relatively uniform magnetic field and can be arranged in a variety of configurations to achieve different levels of magnetic force attraction. For example, two cylindrical magnets could be arranged with their poles aligned, creating a strong magnetic field between them. The magnets could also be designed with a slightly concave shape to create a partial gap between them when the top and bottom halves of the stapler are separated which reduces the strength of the magnetic force attraction therebetween, thereby reducing the amount of friction encountered when sliding a workpiece, such as paper products, between the two coupled housing halves.

The strength of the magnetic force attraction between the two coupled halves of the top housing and the bottom housing should also take into account the weight required to bear the load of the top housing or the bottom housing when either half is being solely held by the user. If this is not accounted for, then either the top or bottom housing may decouple from one another when the user grips either housing without also gripping the other. Specifically, the magnetic force attraction coupling capacity between the first and second magnetic coupling elements 518, 544 may advantageously be at least equal to the weight load of the top housing or the bottom housing, whichever has a larger weight load. Preferably, the magnetic force attraction coupling capacity between the first and second magnetic coupling elements 518, 544 may be at least 10% more than is required to retain the weight load of either the top housing or the bottom housing, thereby providing robust coupling between the elements 518, 544 in such a circumstance by accounting for incident forces due to normal handling by the user.

The coupling base structure 530 of the top housing may comprise a rectangular portion 532 and a contoured portion 534. The rectangular portion 532 may comprise first and second frictional retaining guides 536, 538 and second retention channels 542. The contoured portion 534 may extend from one side of the rectangular portion 532 and may comprise a rotational hinge 540. While rectangular and contoured portions 532, 534 may be utilized in FIG. 5, it is understood that the coupling base structure 530 utilize any suitable or similar shape that allows for a top housing to couple to a bottom housing 510.

The second retention channels 542 may comprise a first set of left and right side channels which may respectively interlock with first retention channels located within the cavity 514 of the bottom housing 510. The first retention channels may comprise a second set of left and right side channels (right side channel not shown in FIG. 5 due to partial cross-sectional view; left side channel not shown in FIG. 5 due to location behind the first magnetic element 518) which may interlock with the first set of left and right side channels of the second retention channels 542. Each of the first and second set of left and right channels may be structurally complimentary in nature such that the first set may be a concave or debossed structure and the second set may be a convex or embossed structure, and vice versa. Thereby, the second retention channels 542 and the first retention channels may interlock with one another.

The first and second set of left and right side channels may interlock in order to removably secure the top housing to the bottom housing 510 via the coupling base structure 530. Specifically, the first and second set of channels may interlock by first inserting the bottom of the coupling base structure 530 through the opening 522 of the bottom housing

510 and against the support plate 520 which then compresses the one or more restorative force elements 516 until the first set of channels of the cavity 514 are axially aligned with the second set of channels of the top coupling base structure 530. Once aligned, the coupling base structure 530 may be horizontally translated (depicted in FIG. 6) within the cavity 514 to interlock the first and second set of channels of the second retention channels 542 and the first retention channels.

Figure 6:
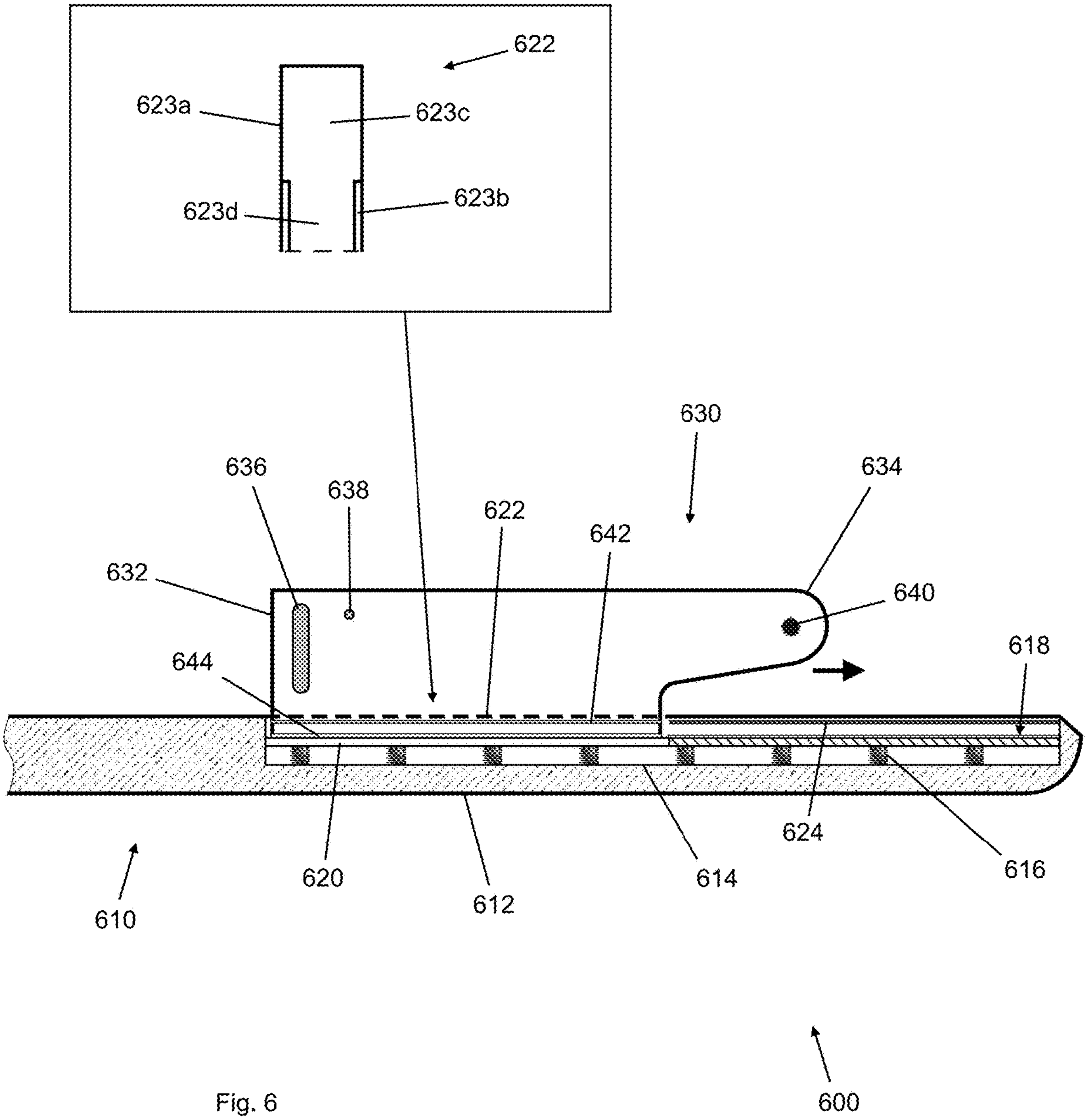
FIG. 6 illustrates a side elevational view of a coupling base structure of a top housing of a magnetically detachable stapler device inserted within a bottom housing of the magnetically detachable stapler device in an inserted position in accordance with some embodiments of the present invention.

As shown in FIG. 6, a side elevational view of a coupling base structure 630 of a top housing of a magnetically detachable stapler device 600 inserted within a cavity 614 of a bottom housing 610 of the stapler device 600 in an inserted position is provided. The magnetically detachable stapler device 600 of FIG. 6 may be structurally at least similar to the stapler device 500 of FIG. 5 and related reference numeral structural elements and, moreover, illustrates the stapler device 600 as it is translated horizontally (illustrated by the horizontal bolded arrow) through the cavity 614 in order to interlock the second retention channels 642 with the first retention channels 624 after alignment as shown in FIG. 6. The inserted position is defined as the coupling base structure 630 being inserted into the cavity 614 of the bottom housing 610 but not yet being translated horizontally through the cavity 614 and secured therein via the first and second retention channels 624, 642.

The coupling base structure 630 is depicted in FIG. 6 as being inserted through the opening 622 of the bottom housing 610 and against the support plate 620 which has compressed the one or more restorative force elements 616 into a compressed state. By compressing the one or more restorative force elements 616 via force applied to the support plate 620, the first retention channels 624 may become axially aligned with the second retention channels 642 as illustrated in FIG. 6. A portion of the opening 622 is illustrated in an overhead plan view in the breakaway box in the upper left portion of FIG. 6. The opening 622 may comprise an outer wall 623*a* defined by the bottom housing 610 and the cavity 614. The outer wall 623*a* and the cavity 614 may collectively define a first opening 623*c* through which the coupling base structure 630 may be initially inserted as illustrated in FIG. 6. The opening 622 may further comprise a plurality of retaining flanges 623*b* that extend from the outer wall 623*a* and define a second opening 623*d* which has a smaller dimensional opening relative the first opening 623*c* as is shown in FIG. 6. Such a structure of the opening 622 is advantageous in that it allows the coupling base structure 630 to be initially inserted therein and then retained therein by sliding the second retention channels 642 under the retaining flanges 623*b* which renders the interlocking of the first and second retention channels 624, 642 optional and even the utilization of the first retention channels 624.

Further, given the support plate 620 comprises the first magnetic coupling element 618 and associated low friction material layer, the second magnetic coupling element 644 and associated low friction material layer may be arranged in a parallel tangential plane with the first magnetic coupling element 618 as shown in FIG. 6. This is an advantageous structural arrangement as it acts as an aid for the user to slide the coupling base structure 630 with low friction across the support plate 620 and the adjacent first magnetic coupling element 618.

The alignment and interlocking of the first retention channels 624 with the second retention channels 642 may be aided and facilitated by providing an outwardly tapering width (i.e. widening) of the adjacent interlocking end of the concave or debossed channel structure. It is advantageous that the concave/debossed channel structures (as opposed to the convex/embossed channel structures) be the retention channels that comprise the outwardly tapering width only on the end that is adjacent the end of the convex/embossed channel structures. Specifically, such a structural configuration makes it easy for the user to visually see which end of the coupling base structure 630 is to be inserted first and further facilitates ease of insertion of the convex/embossed channel structures into the concave/debossed channel structures via the widened width which, upon initial insertion, then guides further insertion as the concave/debossed channel structures taper inwards the further the convex/embossed channel structures are inserted.

Figure 7:
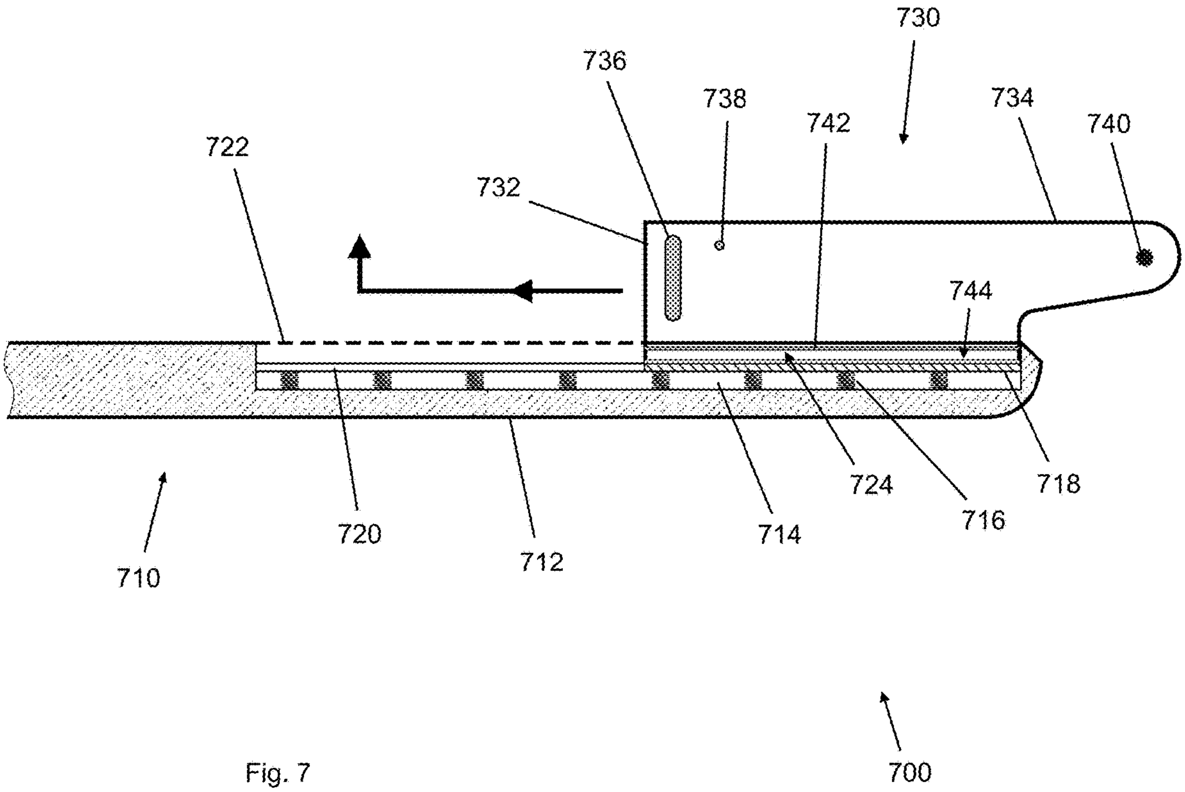
FIG. 7 illustrates a side elevational view of a coupling base structure of a top housing of a magnetically detachable stapler device inserted within a bottom housing of the magnetically detachable stapler device in a secured position in accordance with some embodiments of the present invention.

As shown in FIG. 7, a side elevational view of a coupling base structure 730 of a top housing of a magnetically detachable stapler device 700 inserted within a cavity 714 of a bottom housing 710 of the stapler device 700 in a secured position is provided. The magnetically detachable stapler device 700 of FIG. 7 may be structurally at least similar to the stapler device 600 of FIG. 6 and related reference numeral structural elements and, moreover, illustrates the stapler device 700 as it is fully inserted and secured within the cavity 714 after the second retention channels 742 have been interlocked with the first retention channels 724 (right side channel of first retention channels 724 not shown in FIG. 7 due to partial cross-sectional view; left side channel of first retention channels 724 not directly shown in FIG. 7 due to its location behind the coupling base structure 730).

The secured position is defined as the coupling base structure 730 being fully inserted horizontally into the cavity 714 of the bottom housing 710 after it has been inserted through the opening 722 of the cavity 714. Therefore, the secured position is further defined by the second retention channels 742 being fully inserted into the first retention channels 724 such that the coupling base structure 730 is disposed adjacent a terminal end of the cavity 714 as illustrated in FIG. 7. This position is considered 'secure' given that the first magnetic coupling element 718 is disposed adjacent the second magnetic coupling element 744 which provides a maximum magnetic retaining force in this position. Further, there is added frictional engagement between the interlocking of the first retention channels 724 and the second retention channels 742 given the upward force applied by the support plate 720 via the compressed restorative force elements 716.

It should be noted that, in the secured position, the low friction material layers of both the first and second magnetic coupling elements 718, 744 may be compressed together to an extent that the illustration of distinct low friction material layers adjacent one another in FIG. 7 would be visually indistinguishable and so they are illustrated as a single compressed low friction material layer that separates the first and second magnetic coupling elements 718, 744.

Although this position is considered secure, the coupling base structure 730 is still free to be manipulated out of the secured position and into the inserted position as illustrated and described with reference to FIG. 6. From the inserted position, the coupling base structure 730 may be removed completely from the cavity 714 and placed into the unsecured position as illustrated and described with reference to FIG. 5. From the unsecured position, the coupling base structure 730 may be placed back into the inserted position or may be placed into a magnetic coupling configuration as illustrated and described with reference to FIG. 8.

Figure 8:
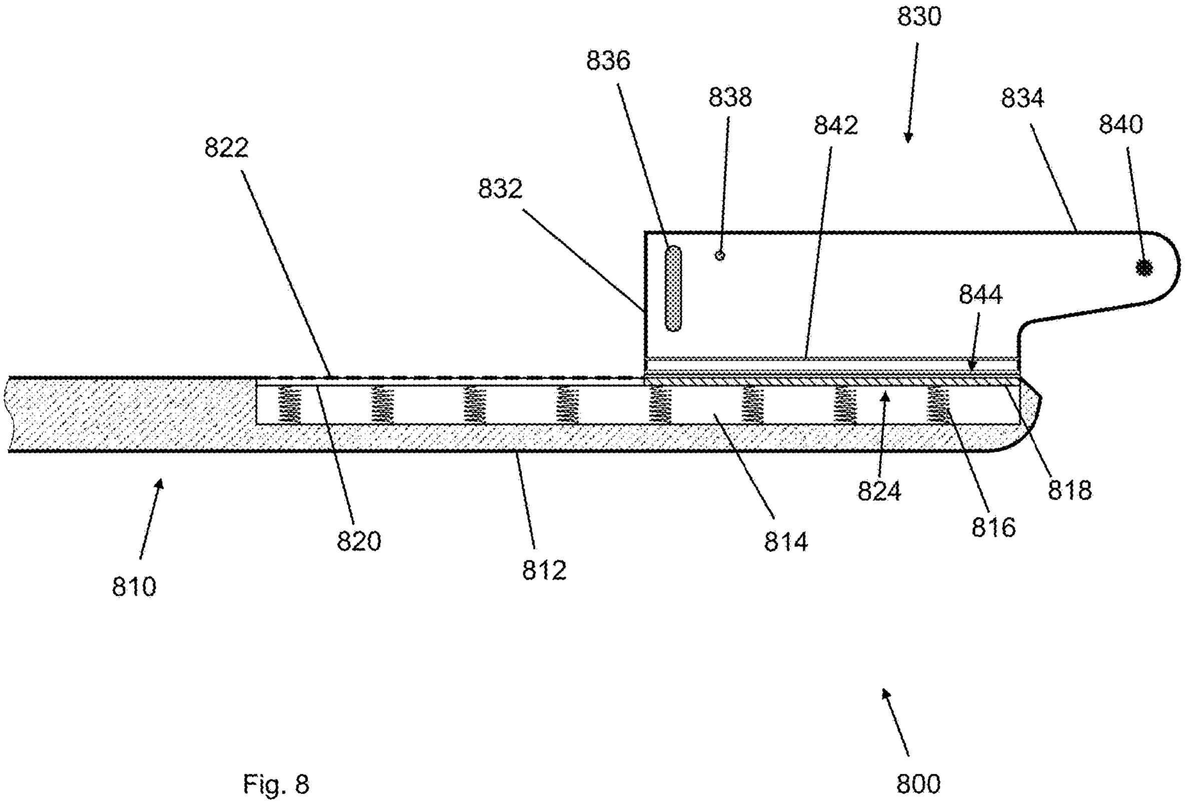
FIG. 8 illustrates a side elevational view of a coupling base structure of a top housing of a magnetically detachable stapler device magnetically coupled to an exterior surface of a bottom housing of the magnetically detachable stapler device in accordance with some embodiments of the present invention.

As shown in FIG. 8, a side elevational view of a coupling base structure 830 of a top housing of a magnetically detachable stapler device 800 magnetically coupled to an exterior surface of a bottom housing 810 of the stapler device 800 is provided. The magnetically detachable stapler device 800 of FIG. 8 may be structurally at least similar to the stapler device 700 of FIG. 7 and related reference numeral structural elements and, moreover, illustrates the stapler device 800 in a magnetically coupled configuration where the coupling base structure 830 is fully removed from the cavity 814 but is still coupled to the bottom housing 810 via magnetic force attraction between the first and second magnetic coupling elements 818, 844.

The magnetically coupled configuration may be solely utilized in which case the use of the cavity 814, the restorative force elements 816, the support plate 820 and the opening 822 may not be utilized. In this magnetically coupled configuration, the coupling base structure 830 (and by extension, the top housing) is coupled to the bottom housing 810 solely via magnetic force attraction between the first and second magnetic coupling elements 818, 844. Therefore, the specific parameters of the magnetic force attraction between the first and second magnetic coupling elements 818, 844 is paramount in producing an optimally functional and effective magnetically detachable stapler device 800.

Specifically, the parameters should account for the following factors: providing a robust coupling between the coupling base structure 830 of the top housing and the bottom housing 810 to achieve basic stapling functionality without causing magnetic decoupling; providing an optimal level of friction between the first magnetic coupling element 818, a workpiece to be stapled, and the second magnetic coupling element 844; and providing adequate magnetic force attraction to support the weight load of either the top housing and its structural components or the bottom housing and its structural components, whichever is greater in load. Satisfying such parameters will provide advantageous ideal functionality of the magnetically detachable stapler device 800.

A desirable range of magnetic force attraction for the magnetically detachable stapler device 800 may be between about 0.5 Newtons and 10 Newtons of force, or in pounds between about 0.1 pounds of force and 2.25 pounds of force. Such a range of magnetic force attraction is justified in solving for the aforementioned three criteria considering there are many variables that may play into the amount of magnetic force attraction desired including, but not limited to, the weight of the materials utilized in the top and bottom housings, the thickness of the workpiece to be stapled, the material selected for the low friction material layer, the size, type and arrangement of the magnetic coupling elements and the like.

Therefore, considering all of these factors, a magnetic force attraction of substantially less than 0.5 Newtons would not be advantageous because, while it does minimize the level of friction, it does not provide enough of a robust coupling between the top and bottom housings to satisfy the other two criteria even when using the most ideal features to help satisfy the other two criteria. Further, a magnetic force attraction of substantially more than 10 Newtons would not be advantageous because, while it does maximize the degree of coupling between the top and bottom housings, it provides too much frictional force between the workpiece and the top and bottom housings which renders the stapler device nonfunctional for the intended purposes even when using the most ideal features to help satisfy this criteria.

Preferably, the range of magnetic force attraction for the magnetically detachable stapler device 800 may be between about 2 Newtons and 8 Newtons of force, or in pounds between about 0.45 pounds of force and 1.8 pounds of force. Such a preferred range of magnetic force attraction removes the extreme edge cases in terms of least advantageous materials, structural shapes, magnetic arrangements and the like from a fabrication cost perspective while still solving for the aforementioned three criteria.

This preferred range of magnetic force attraction would provide enough force to create a robust coupling between the top housing and the bottom housing 810 of the stapler device 800, ensuring that the two halves remain securely attached during the stapling process, while also providing an optimal level of friction between the magnetic coupling elements 818, 844 and the workpiece to be stapled. The low-friction coating applied to the magnetic coupling elements 818, 844 would further reduce any potential for excessive friction. Additionally, the magnetic force would be strong enough to support the weight load of either the top housing or the bottom housing 810 and their structural components, ensuring that a user can handle the stapler by only gripping the top housing or the bottom housing 810 without causing the two halves to become magnetically decoupled.

Figure 9:
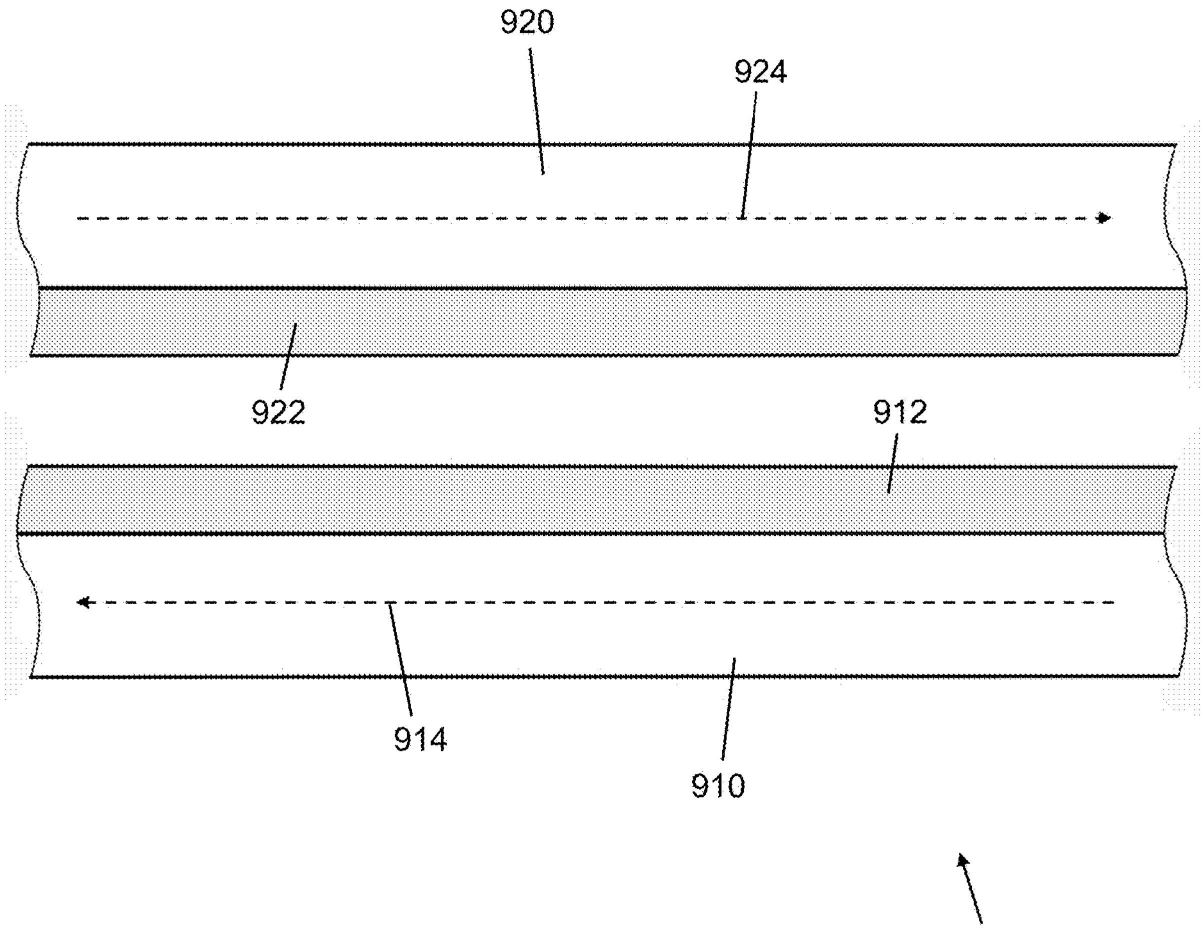
FIG. 9 illustrates a partial side view of top and bottom housing magnetic coupling elements of a magnetically detachable stapler device with respective low-friction layers disposed thereover and disposed adjacent one another in accordance with some embodiments of the present invention.

As shown in FIG. 9, a partial side view of top and bottom housing magnetic coupling elements 910, 920 of a magnetically detachable stapler device 900 with respective low friction material layers 912, 922 disposed thereover and disposed adjacent one another is provided. Specifically, the magnetic coupling elements 910, 920 illustrated in FIG. 9 having substantially unidirectional magnetic field lines 914, 924 therein. Such magnetic field lines may be found in bar magnets, for example, among other magnet arrangements.

By arranging the magnetic field lines 914, 924 in opposite directions, a strong magnetic force attraction may result that magnetically couples the first and second magnetic coupling elements 910, 920 together. Upon coupling together, the respective low friction material layers 912, 922 may be utilized to reduce the frictional force experienced by a workpiece situated between the two magnetic coupling elements 910, 920. This allows for the workpiece-to-be-stapled to be manipulated by a user between the elements 910, 920 into a desired position so that a staple may be inserted therethrough from the stapler device 900.

In the fabrication process of the magnetic coupling elements 910, 920, the low-friction material layers 912, 922 are applied to the magnetic coupling elements 910, 920 to reduce friction and enhance the smooth movement of paper or other materials. A preferred method involves a coating process where the magnetic coupling elements 910, 920, composed of suitable magnet materials, undergo a surface preparation step to ensure optimal adhesion. Subsequently, a thin layer of the selected low-friction material, such as Teflon or silicone, is applied to the prepared surfaces through techniques like spray coating, dip coating, or electrostatic deposition. The coating process ensures uniform coverage of the magnetic coupling elements 910, 920 while maintaining their magnetic properties. This application of the low-friction material layers 912, 922 provides a relatively slippery and non-stick surface, minimizing frictional resistance during the movement of paper, thereby facilitating seamless alignment and manipulation of the stapler and its associated components.

In the spray coating method, a fine mist of the low-friction material is generated using a spray gun or nozzle, and the mist is directed towards the surface of the magnetic coupling elements 910, 920, ensuring even coverage. The dip coating method involves immersing the magnetic coupling elements

910, 920 into a bath of the low-friction material solution, allowing the material to adhere uniformly to the surfaces. Electrostatic deposition is another technique where the low-friction material is electrically charged and then sprayed onto the magnetic coupling elements, resulting in controlled and precise deposition due to the electrostatic attraction. These techniques enable the consistent and efficient application of the low-friction material layers 912, 922, ensuring that the resulting surfaces exhibit the desired non-stick and low-friction properties necessary for smooth movement and alignment of paper or other materials during stapling operations.

Figure 10:
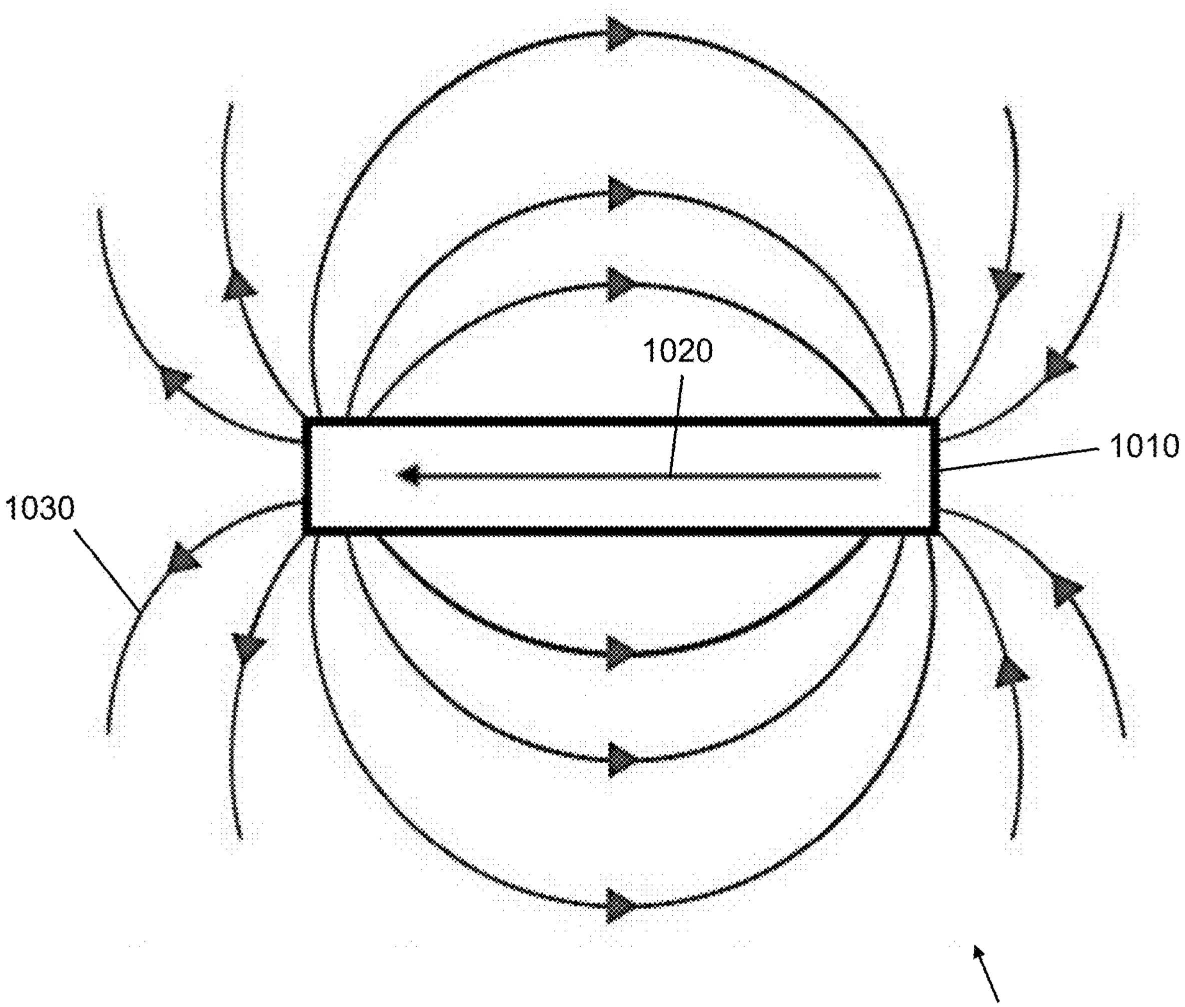
FIG. 10 illustrates a diagram of magnetic field lines produced inside and outside of a bar magnet used as a magnetic coupling element for a magnetically detachable stapler device in accordance with some embodiments of the present invention.

As shown in FIG. 10, a diagram of magnetic field lines 1020, 1030 produced inside and outside of a bar magnet 1010 used as a magnetic coupling element for a magnetically detachable stapler device 1000 is provided. The magnetic field lines 1020 within the bar magnet 1010 are unidirectional in nature and move from a south pole to a north pole and are emitted from the end of the north pole and loop back around to the south pole as illustrated by the magnetic field lines 1030 outside of the bar magnet 1010. When coupling two bar magnets 1010 together with opposite poles aligned, then the field lines 1030 outside of the bar magnet 1010 are additively superimposed and so provide a robust magnetic force attraction therebetween.

Figure 11:
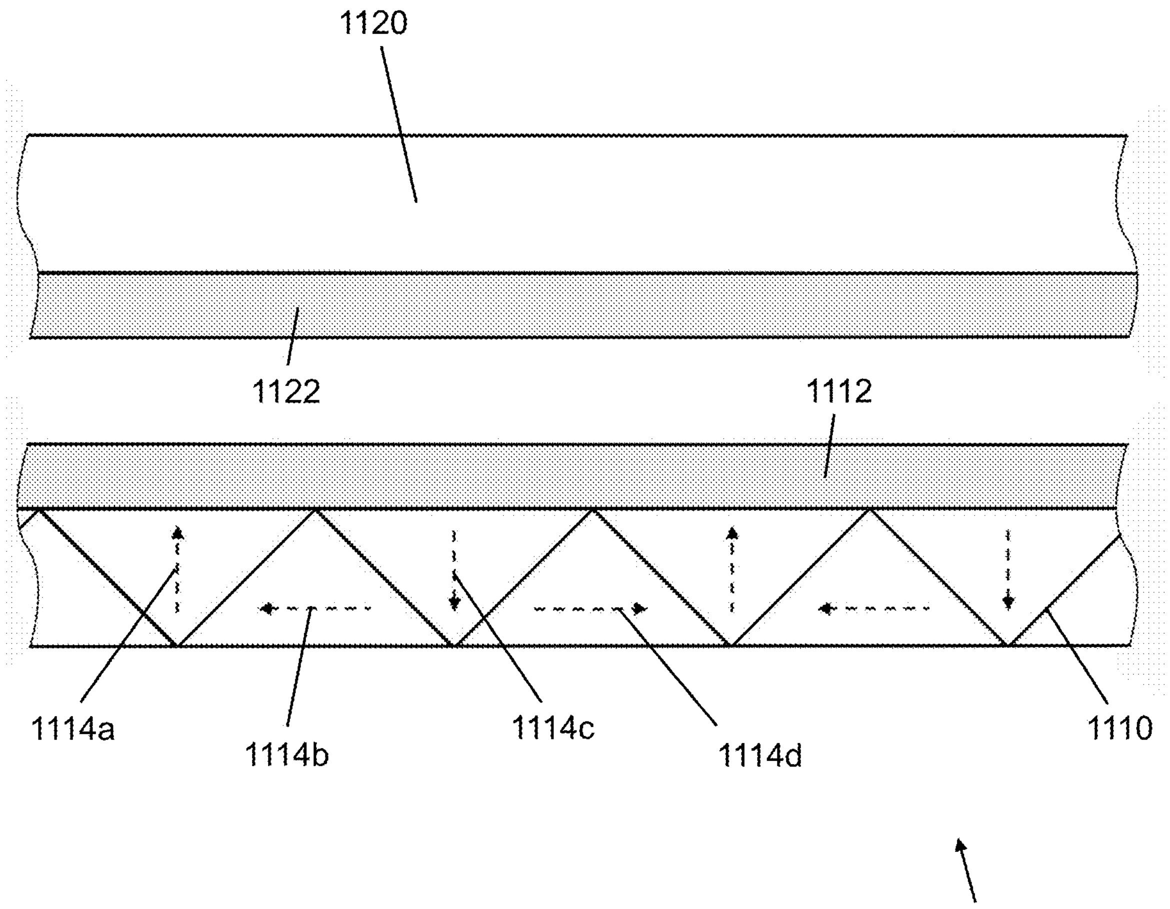
FIG. 11 illustrates a partial side view of a top housing and a bottom housing magnetic coupling element of a magnetically detachable stapler device with respective low-friction layers disposed thereover and disposed adjacent one another in accordance with some embodiments of the present invention.

As shown in FIG. 11, a partial side view of a top housing and a bottom housing magnetic coupling elements 1110, 1120 of a magnetically detachable stapler device 1100 with respective low-friction layers 1112, 1122 disposed thereover and disposed adjacent one another is provided. Specifically, the magnetic coupling elements 1110, 1120 illustrated in FIG. 11 have different magnetic field lines therein. For instance, the magnetic coupling element 1110 comprises multiple magnets arranged in an array such that each magnet has a magnetic field line that is 90 degrees rotated relative successive magnets in the array. This produces magnetic field lines 1114*a*-1114*d* which, upon superposition, are partially additive and partially cancel out. Such a magnet array may be found in halbach arrays, for example, among other magnet arrays.

On the other hand, the magnetic coupling element 1120 does not produce any innate magnetic field which is commonly found in some metallic materials such as, but not limited to, iron, nickel, cobalt and the like. These materials are, however, attracted to magnets and so may be used the magnetic coupling element 1120 in order to couple to the magnet array of magnetic coupling element 1110.

By arranging the magnetic field lines 1114*a*-1114*d* in successive 90 degree rotations, a strong magnetic force attraction may be produced on the side of the element 1110 adjacent element 1120 but no magnetic force attraction may be produced not the side of the element 1110 opposite that of element 1120. Such an arrangement may be advantageous in that it results in magnetically coupling the first and second magnetic coupling elements 1110, 1120 together but not allowing objects on other side of elements 1110, 1120 to be magnetically attracted to either. This could prevent some unwanted magnetic interaction with other magnetically susceptible objects not associated with the stapler device 1100 such as electronics or other metal objects.

Upon coupling together, the respective low friction material layers 1112, 1122 may be utilized to reduce the frictional force experienced by a workpiece situated between the two magnetic coupling elements 1110, 1120. This allows for the workpiece-to-be-stapled to be manipulated by a user between the elements 1110, 1120 into a desired position so that a staple may be inserted therethrough from the stapler device 1100.

Figure 12:
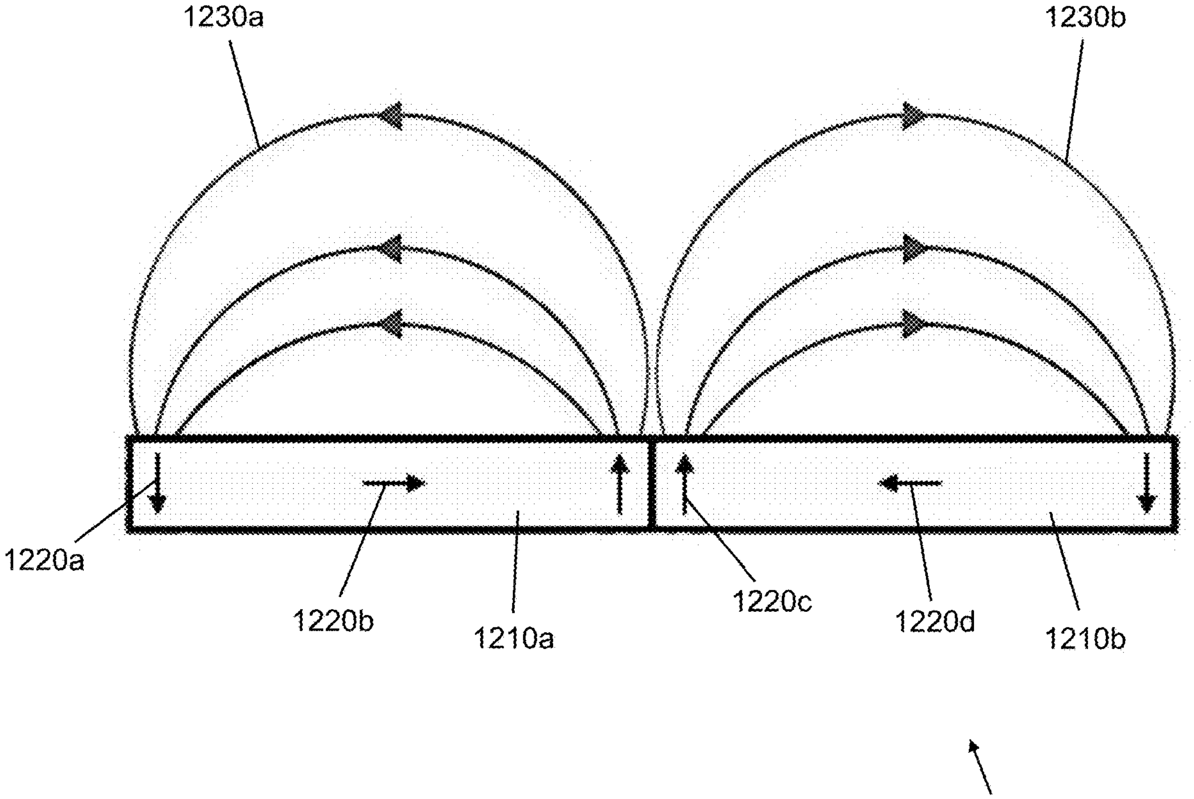
FIG. 12 illustrates a diagram of magnetic field lines produced inside and outside of a magnet array used as a magnetic coupling element for a magnetically detachable stapler device in accordance with some embodiments of the present invention.

As shown in FIG. 12, a diagram of magnetic field lines produced inside 1220*a*-1220*d* and outside 1230*a*, 1230*b* of a magnet array 1210*a*, 1210*b* used as a magnetic coupling element for a magnetically detachable stapler device 1200 is provided. The magnetic field lines 1220*a*-1220*d* within the first and second magnet 1210*a*, 1210*b* of the array are rotated by 90 degrees relative each successive one. This may be achieved by providing multiple magnets within the first and second magnets 1210*a*, 1210*b*. When coupling the two magnets 1210*a*, 1210*b* together in parallel with like poles adjacent one another, then the field lines 1230*a*, 1230*b* outside of the magnets 1210*a*, 1210*b* are additive above and cancel below as illustrated in FIG. 12 and so provide a robust magnetic force attraction above the magnets 1210*a*, 1210*b* but no magnetic force attraction below.

With regard to FIGS. 1-12, the magnetic coupling elements may take the form of one or more electromagnets which may be incorporated into the magnetically detachable stapler device by designing an electrical circuit that includes a power source, control switch, and magnetic coil. The magnetic coil may be positioned in one of the magnetic coupling elements, and the control switch may allow the user to activate or deactivate the magnetic field as needed. This design can be useful for accommodating different paper dimensions and solves the needs of both the robustly coupled configuration where paper is not disposed between the electromagnets as well as the detachable configuration where paper is disposed and movable between the electromagnets. By adjusting the level of electric current flowing through the coil, the user may control the strength of the magnetic force and customize it to their specific needs.

It should be noted that the use of electromagnets provides a flexible and customizable solution for a magnetically detachable stapler device, allowing the user to adjust the magnetic force attraction as needed for different applications, without the need to provide magnets with a specified "Goldilocks zone" of magnetic force attraction that solves the needs of both the robustly coupled configuration where paper is not disposed between the electromagnets as well as the detachable configuration where paper is disposed and movable between the electromagnets. The incorporation of an electrical circuit and magnetic coil can provide a unique advantage over traditional permanent magnet arrangements and can make the stapler more versatile and user-friendly.

With regard to FIGS. 1-12, the core concept of the magnetically detachable stapler device can be extrapolated to a wide range of similar office devices, including three-hole punch devices, embossing devices, paper shears, staple guns and the like. The use of magnetic coupling elements and low-friction coatings can provide a versatile and user-friendly solution for a variety of applications that allows users to easily align and manipulate paper or other workpieces as needed when those devices otherwise could not reach desired locations of operation due to dimensional constraints of such devices. For example, any of these alternate devices could incorporate magnetic coupling elements and a low-friction coating to allow for separation of the device into at least two parts to selectively secure the device around the workpiece at a desired operational location. The middle portions of such workpieces are typically not capable of being reached as operational locations by alternate devices and so the ability to separate such devices and recouple them around the workpiece allows the middle portions to be reached as operational locations.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All features disclosed in the specification, claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Throughout this disclosure, the phrase 'modularly coupled' and similar terms and phrases are intended to convey that any element of a given class of elements may be coupled to another given element and vice versa with equal effect. For example, any extension cord of a plurality of extension cords may be modularly coupled to another extension cord and vice versa with equal effect. Further, throughout this disclosure, the phrase 'removably coupled' and similar terms and phrases are intended to convey that a given element may be iteratively coupled to and removed from another given element as desired. For example, a male plug of a first extension cord may be removably coupled to a female plug of a second extension cord as desired.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "coupled" or"connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. A magnetically detachable stapler device, comprising:

a bottom housing having a first magnetic coupling element, wherein:
- the first magnetic coupling element comprises a first low friction material layer disposed thereupon,
- the bottom housing comprises a cavity disposed therein, and
- the cavity comprises first retention channels; and a top housing having a coupling base structure, a magazine and a hammer, wherein:
- at least one of the top housing, the magazine and the hammer moves relative the coupling base structure,
- the coupling base structure comprises a second magnetic coupling element,
- the second magnetic coupling element comprises a second low friction material layer disposed thereupon, and
- the cavity comprises a partial opening shaped to accommodate insertion of the coupling base structure therein.

2. The magnetically detachable stapler device of claim 1, wherein the bottom housing comprises a first contoured bevel.

3. The magnetically detachable stapler device of claim 1, wherein the bottom housing comprises an anvil crimp area.

4. The magnetically detachable stapler device of claim 1, wherein the bottom housing comprises one or more restorative force elements within the cavity.

5. The magnetically detachable stapler device of claim 4, wherein a support plate is supported by the one or more restorative force elements within the cavity.

6. The magnetically detachable stapler device of claim 1, wherein the coupling base structure comprises one or more frictional retaining guides.

7. The magnetically detachable stapler device of claim 1, wherein the coupling base structure comprises second retention channels.

8. The magnetically detachable stapler device of claim 7, wherein first retention channels of the bottom housing are shaped to interlock with the second retention channels.

9. The magnetically detachable stapler device of claim 1, wherein:

the top housing, the magazine and the hammer all rotate relative the coupling base structure; and the coupling base structure comprises a hinge inserted therethrough about which the top housing, the magazine and the hammer all rotate.

10. The magnetically detachable stapler device of claim 1, wherein the coupling base structure comprises a spring disposed between the magazine and the second magnetic coupling element.

11. The magnetically detachable stapler device of claim 1, wherein one or more frictional retaining guides of the coupling base structure frictionally retain the magazine.

12. The magnetically detachable stapler device of claim 1, wherein the top housing comprises a second contoured bevel.

13. The magnetically detachable stapler device of claim 1, wherein the coupling base structure is disposed in a magnetically coupled configuration when the first magnetic coupling element is disposed adjacent to the second magnetic coupling element.

14. The magnetically detachable stapler device of claim 13, wherein, in the magnetically coupled configuration, the first and second low friction material layers are disposed between the first and second magnetic coupling elements.

15. The magnetically detachable stapler device of claim 13, wherein, in the magnetically coupled configuration, the first and second low friction material layers are not in direct contact when in a workpiece configuration and are in direct contact when in a non-workpiece configuration.

16. A magnetically detachable stapler device, comprising:

a bottom housing having a first magnetic coupling element, wherein:

the first magnetic coupling element comprises a first low friction material layer disposed thereupon, the bottom housing comprises a cavity disposed therein, and the cavity comprises first retention channels; and a top housing having a coupling base structure, a magazine and a hammer, wherein:

at least one of the top housing, the magazine and the hammer moves relative the coupling base structure, the coupling base structure comprises a second magnetic coupling element, the second magnetic coupling element comprise a second low friction material layer disposed thereupon, the coupling base structure is disposed in a magnetically coupled configuration when the first magnetic coupling element is disposed adjacent to the second magnetic coupling element, in the magnetically coupled configuration, the first and second low friction material layers are disposed between the first and second magnetic coupling elements, and the cavity comprises a partial opening shaped to accommodate insertion of the coupling base structure therein.

17. A magnetically detachable stapler device, comprising:

a bottom housing having a first magnetic coupling element, wherein:

the first magnetic coupling element comprises a first low friction material layer disposed thereupon, the bottom housing comprises a cavity disposed therein, and the cavity comprises first retention channels; and a top housing having a coupling base structure, a magazine and a hammer, wherein:

at least one of the top housing, the magazine and the hammer moves relative the coupling base structure, the coupling base structure comprises a second magnetic coupling element, the second magnetic coupling element comprise a second low friction material layer disposed thereupon, the coupling base structure is disposed in a magnetically coupled configuration when the first magnetic coupling element is disposed adjacent to the second magnetic coupling element, in the magnetically coupled configuration, the first and second low friction material layers are not in direct contact when in a workpiece configuration and are in direct contact when in a non-workpiece configuration, and the cavity comprises a partial opening shaped to accommodate insertion of the coupling base structure therein.

* * * * *